3,169,468
APPARATUS FOR PROCESSING CEREAL PRODUCTS
Max R. Dietz, Merle R. Emerson, Norman A. Hurley, and Thomas Svanoe, all of Oakland, Calif., assignors to Gerber Products Company, Fremont, Mich.
Filed May 3, 1960, Ser. No. 26,516
3 Claims. (Cl. 99—237)

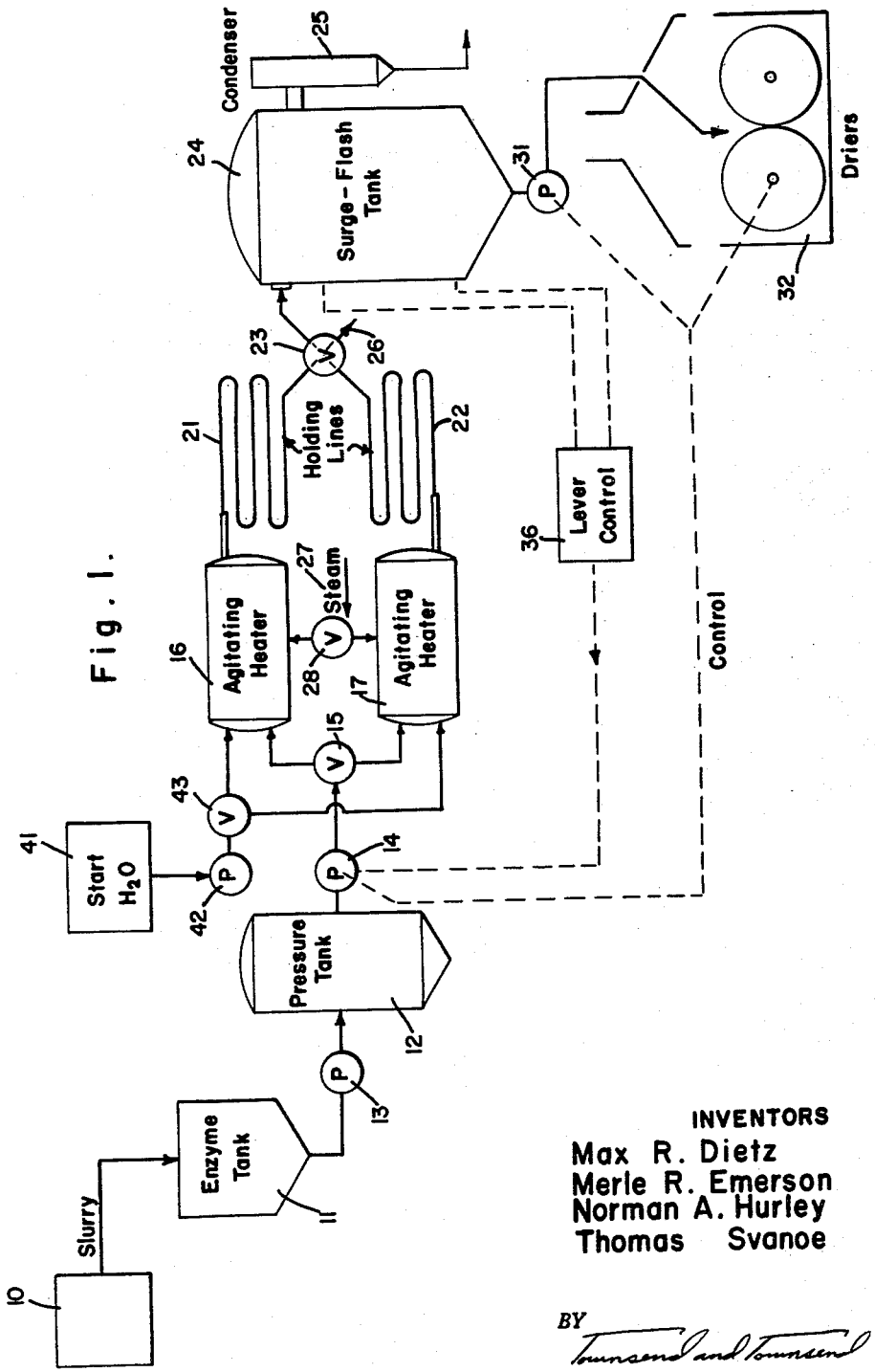

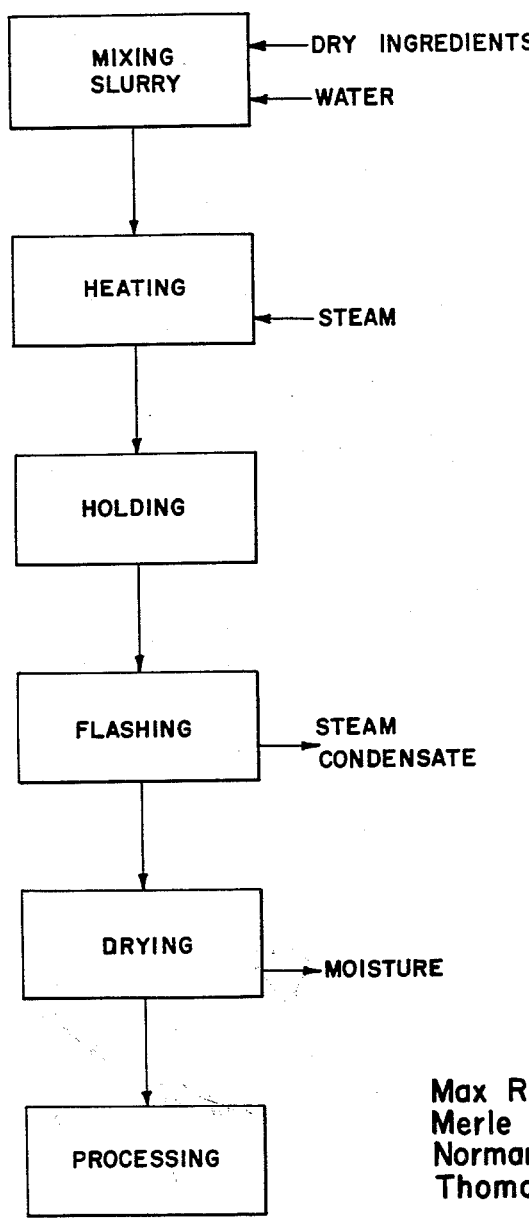

This invention relates generally to a method of processing cereals, and specifically to apparatus for sterilizing cereals during the course of processing.

While it is generally desirable to control the bacteria count in any food, it is extremely important to maintain close control of cereals and other foods that are to be used by infants and small children. An adult's resistance to bacteria is more fully developed than that of an infant, the latter being particularly susceptible to diseases and other illnesses attributable to impurities of one sort and another.

While it is generally desirable to minimize the amount of bacteria present in cereals and other types of foods, it is a difficult task since the complexity of cereal processing has increased over the past years, particularly with the advent of precooked foods, etc. In spite of this, the salutory nature of low bacteria counts justifies attempts to effectively sterilize food products.

The most common technique previously employed is often referred to as terminal sterilization. It has as its object sterilizing the end product after processing and packaging. None of the terminal sterilization efforts to date have worked well because the dry cereal product is not in a state in which it is most efficiently amenable to bacteriological reduction. Alternatively, the chemicals employed to kill the bacteria have adversely affected the palatableness and/or purity of the product or proved dangerous to personnel handling them. For example, one line of proposals suggests the use of an ethylene oxide atmosphere in which the dry cereal is placed for a number of hours. This type of terminal sterilization does reduce the bacteria count nominally, however, its use is dangerous from a handling standpoint and, some believe, from a chemical standpoint.

The present invention envisions sterilizing cereals during the time in which the cereals are in slurry form. The advantage of slurry sterilization is theoretically obvious since the product is in a condition most amenable to the use of heat to sterilize or kill bacteria present. At the same time, the problems encountered in evolving apparatus that performs the sterilization task without degrading the taste of the product has caused the problem to be approached with caution. In spite of this and other difficulties, however, the apparatus of the present invention satisfactorily sterilizes cereals such as oatmeal, barley, rice, high protein, and mixed grains without degrading the taste and texture of the end product nor substantially decreasing the capabilities of the cereal processing line.

While the reasons for the high bacteria counts are to be found in a myriad of causes, including initial impurities as well as those introduced as necessary concomitants of a processing line, slurry sterilization of cereal effects marked improvement in bacteria count. For example, in tests run to determine the order of improvement, it has been found that the thermospores and standard plate counts are reduced to zero or at least to the point where they cannot be detected. It will be recalled that these two measures are often used to determine the bacteria present in a product. The thermospores count measures the spore forming aerobic organisms that will grow on dextrose tryptone agar when plates are incubated at 120° to 130° F. The standard plate count is a measure of the mesophilic aerobes capable of growth on nutrient agar plates at a temperature of 98° F.

In sterilizing cereal slurry by using the present process and apparatus, it is necessary to select temperatures and holding times at the selected temperatures that will kill the bacteria in the slurry. It is known that the holding time can be calculated by the formula $$T = F \log^{-1}_{10}\left(\frac{250-5}{Z}\right)$$

where $T$ = holding time in minutes
$t$ = temperature in ° F.
$Z$ = a constant determined by the slope of the thermal death curve, and
$F$ = constant determined by time to kill approximately 10,000 spores inoculated into aliquots of cereal slurry (18.5 minutes at 250° F.).

In the present situation, $Z = 18$ degrees, which means that for each 18 degrees change in sterilization temperature, the time to accomplish it is reduced tenfold. For example, to reduce the time from 100 to 10 minutes or from 10 to 1 minute, etc., requires 18 degrees of change. With this constant and the particular formula set forth, a given slurry temperature provides the necessary factors for determining holding time. From the standpoint of sterilization, there is no reasonable lower or upper limit with respect to the temperature employed. From the practical standpoint of harming the cereal's taste, texture and mixing characteristics and/or causing build-up or burn-on of the slurry on the temperature sensing devices associated with the apparatus, however, the use of temperatures above 280° requires careful attention to control. Even so, temperatures upward to 330° F. or so are plausible. Insofar as the mixing and texture characteristics are concerned, the higher temperatures create problems that are more easily avoided. Thus, in a continuous cereal processing line temperatures in the 270°–290° range with holding times chosen accordingly provide a straightforward arrangement.

From the foregoing, it can be seen that the principal object of the present invention is to provide a method for processing cereals that is highly efficient in maintaining a low bacteria count in the product without substantial loss in line efficiency, processing time, maintenance, and/or mixing characteristics and texture of the product.

A feature of the invention pertains to providing one or more heaters for raising the temperature of the cereal slurry to the desired temperature and holding line means for maintaining the slurry at the elevated temperatures for the required period of time. These components must be associated with the necessary pumping and diverting means for directing the cereal slurry through the heater and holding line as well as some means for removing moisture added to the slurry during the heating step.

More particularly, a feature of the invention pertains to the combination of an agitating type, steam injector heater for raising the temperature of the slurry to the desired level, a holding line of a preselected length and diameter for maintaining the slurry at the elevated temperature for the necessary interval of time, a surge flash tank for removing the steam entrained moisture from the slurry, means for causing the slurry to flow through the heater, holding means and surge tank in that order, and control means associated with the apparatus to regulate the flow and temperatures of the slurry at various points in the system.

The method for processing cereals of the oatmeal, barley, rice, etc., variety involves the steps of forming a slurry of the dry ingredients of the cereal, heating the slurry to a predetermined temperature, holding the slurry at the elevated temperature for a preselected period of time, flashing the cereal slurry to remove excess moisture from the slurry, drying the slurry, and processing further the cereal to form the finished cereal.

These and other objects and features of the present invention may be more fully understood when the following detailed description is read with reference to the drawings, in which:

FIG. 1 is a schematic diagram of the apparatus employed to sterilize the cereal slurry, and FIG. 2 is a flow diagram illustrating the method for processing cereal in accordance with the present invention.

Looking to the apparatus in FIG. 1 first, it can be seen that a slurry of the cereal ingredients and water is mixed in mixing vat 10 and passed through pretreating apparatus, illustratively shown as an enzyme tank 11 and pressure tank 12 interconnected by feed pump 13. The slurry is pumped by another feed pump 14 through a line selector valve 15 to one or the other of agitating heaters 16 and 17. Agitating heaters 16 and 17 are respectively connected through holding lines 21 and 22 to the input side of an output selector valve 23. The output from the selector valve 23 is directed into the surge tank 24 or alternatively to a gutter by way of line 26.

In operating the cereal sterilization apparatus, the valves 15 and 23 are set so that feed pump 14 pumps the slurry through heater 16 and holding line 21 to the surge tank or through heater 17 and holding line 22. If the slurry is pumped through heater 16 and holding line 21 to the surge flash tank 24, the other holding line 22 is connected through valve 23 to the gutter or exhaust line 26. This particular arrangement is employed in order to permit one of the heater-holding lines to be cleaned while the other is in operation. A source of steam 27 is provided through a valve 28 to heater 16 or 17 as required.

The slurry is pumped through agitating heater 16 and holding line 21, for example, into surge flash tank 24 wherein the condensate is flashed through condensor 25 or comparable exhaust apparatus to a gutter or other disposal means. The flashed slurry is pumped out of tank 24 by pump 31 into drier 32 for drum drying or some similar means of further processing the cereal. The output from drier 32 may be further processed by well known means. For example, sheets of the cereal may be formed on the drums of drier 32 and thereafter flaked, toasted, gravity separated, and packaged.

A level control 36 is provided to cooperate with surge-flash tank 24 to control the feed pump 14 and regulate the amount of cereal slurry flowing through the agitating heater 16 and holding line 21 into the tank. Means (not shown) are also associated with the drier 32 to control pumps 14 and 31, depending upon the number of driers in operation. If a single drier is in operation, the temperature at the output of valve 23 can be maintained somewhat lower than if two or three driers are in operation. On the other hand, for the given holding line 21, if two are three driers are in operation the initial temperature of the slurry must be elevated to assure a proper holding time-temperature relation. In either case, the pumps 14 and 31 must be integrated with the capacity of the driers 32 in operation to maintain a continuous flow of cereal slurry onto the drums of the driers. In one exemplary run of a cereal sterilization line temperatures at valve 23 were 270° with one drum drier in operation, 273° F. with two drum driers in operation, and 278° with three drum driers in operation. These temperatures satisfy the requirement of holding time as specified in the previously discussed formula.

One of the problems associated with running a cereal sterilization line is to provide means for starting up the line after shut down for cleaning, lay offs, or repairs. In order to prime or presterilize the line as required, a source of water 41 is provided. The water source 41 is connected through a pump 42 and valve 43 to the one agitating heater (16, 17) to be used. Preparatory to starting the flow of cereal slurry through the apparatus, the water supply 41 is caused to flow through the heater and holding line to raise the temperatures of the agitating heaters and holding line to the 250°–330° F. range. The flow is maintained for approximately one-half hour. As soon as presterilization is completed, valve 43 is shut off and valve 15 opened to permit slurry to flow from the pressure tank 12 into the heater-holding line in service.

It should be noted that valve 15, 23 and 43 may be pneumatically sequenced so that the process line may be operated continuously. Thus, control means may be provided to operate the valves so that the presterilization tank 41 is switched out or in preparatory to switching over from one heater-holding line to the other. Once a selection is made, the valves are operated in timed relation to accomplish the results.

Turning to the flow chart of FIG. 2, it is noted that the process of producing cereals in accordance with the present invention comprises the steps of mixing the slurry from dry ingredients and water, pretreating the slurry, heating the slurry to the predetermined temperature by way of steam and preferably in an agitating heater, holding the heated cereal slurry at approximately the preselected temperature for the required period of time, flashing the cereal slurry in order to remove the moisture added by the steam heating step, drying the cereal, and processing the dried cereal to provide the finished cereal product.

While the present invention has been described and disclosed with respect to an exemplary arrangement of apparatus, it should be apparent to those skilled in the art that variations in the specific apparatus may be employed without departing from the spirit and scope of the present invention. For example, non-agitating heaters may be employed and various sizes and length holding lines may be used. Then too, there is no absolute necessity for employing a steam type of heating although, from a practical standpoint, it is one of the few types that will work satisfactorily with the products at the elevated temperatures required. The possibilities of burning or otherwise adversely affecting the cereal makes dry heating a dubious arrangement. Since such modifications as noted above are possible, the present invention should be limited only to the extent of the appended claims.

What is claimed is:

1. Apparatus for the continuous sterilization of cereal slurry comprising: a source of slurry, first and second steam injection agitating slurry heaters for heating slurry to a temperature sufficient to kill bacteria therein, first and second holding means associated respectively with said first and second heaters for receiving heated slurry therefrom and for maintaining the heated slurry received at a temperature and for a time sufficient to kill the bacteria therein, a flash tank, means for alternately selectively joining one of said holding means at a time in fluid communication with said tank and simultaneously joining the other of said holding means to an exhaust line, a source of presterilization fluid, and means for alternately selectively joining said source of presterilization fluid with the heater whose associated holding means is then being exhausted and for simultaneously linking said source of slurry in fluid communication with the other of said heaters.

2. Apparatus in accordance with claim 1 and including drier means linked in fluid communication with said flash tank for receiving flashed slurry therefrom and further reducing the moisture content thereof.

3. Apparatus in accordance with claim 1 wherein said first and second holding means comprise lengths of pipe adapted to maintain slurry therein for the requisite time and at the requisite temperature.

(References on following page)

References Cited by the Examiner

UNITED STATES PATENTS

| | | | |
|---|---|---|---|
| 2,358,251 | 9/41 | Huzenlaub et al. | 99—80 |
| 2,525,137 | 10/50 | Jones et al. | 99—237 X |
| 2,592,170 | 4/52 | Muller | 99—237 |
| 2,638,837 | 5/53 | Talmey et al. | 99—237 |
| 2,732,308 | 1/56 | Laguilharre | 99—251 X |
| 2,801,087 | 7/57 | Hawk. | |
| 2,801,176 | 7/57 | Ozai-Durrani | 99—80 |
| 2,808,333 | 10/57 | Mickus et al. | 99—80 |
| 2,908,577 | 10/59 | Hawk et al. | 99—182 X |
| 3,041,958 | 7/62 | Abrams | 99—251 |
| 3,085,496 | 4/63 | Reynolds | 99—263 |

FOREIGN PATENTS 125,725 10/47 Australia.

ROBERT E. PULFREY, *Primary Examiner.*

A. H. WINKELSTEIN, GEORGE A. NINAS, Jr., JEROME SCHNALL, *Examiners.*